United States Patent [19]

Depatie et al.

[11] Patent Number: 5,325,142
[45] Date of Patent: Jun. 28, 1994

[54] VARIABLE CLOSE LOOP CONTROLLED APERTURE/SHUTTER SYSTEM

[75] Inventors: Jean F. Depatie, Albion; William D. VanArsdale, Spencerport; William M. Leonard, Brockport, N.Y.

[73] Assignee: Eastman Kodak Company, Rochester, N.Y.

[21] Appl. No.: 995,241

[22] Filed: Dec. 22, 1992

[51] Int. Cl.$^5$ .............................. G03B 09/08
[52] U.S. Cl. .................................. 354/234.1
[58] Field of Search ............... 354/434–437, 354/439, 440, 446, 448, 451, 452, 234.1, 234.2; 250/229

[56] References Cited

U.S. PATENT DOCUMENTS

| | | | |
|---|---|---|---|
| 2,026,675 | 4/1935 | Edwards | 354/446 |
| 2,058,562 | 12/1935 | Bucky et al. | 354/446 |
| 3,209,667 | 9/1961 | Countant | 354/451 |
| 3,684,701 | 8/1972 | Fuller | 208/308 |
| 3,882,522 | 5/1975 | Erlichman | 354/437 |
| 3,898,252 | 8/1975 | Serota et al. | 554/161 |
| 3,978,497 | 8/1976 | Kondo | 354/448 |
| 3,987,461 | 10/1976 | Kondo | 354/448 |
| 4,040,067 | 8/1977 | Kondo | 354/448 |
| 4,413,892 | 11/1983 | Lambeth | 354/21 |
| 4,470,687 | 9/1984 | Saito et al. | 354/435 |
| 4,557,573 | 12/1985 | Johnson et al. | 354/234.1 |
| 4,851,870 | 7/1989 | Tanaka et al. | 354/234.1 |
| 4,972,078 | 11/1990 | Hasebe et al. | 250/229 |

FOREIGN PATENT DOCUMENTS 63-14135   1/1988   Japan .

Primary Examiner—Howard B. Blankenship
Attorney, Agent, or Firm—David A. Howley

[57] ABSTRACT

An electronically actuated shutter in which the location of the shutter blades are known to accurately control the aperture size and exposure. A gradient neutral density strip, a light source and a light detector are used to determine the position of the shutter blades.

11 Claims, 6 Drawing Sheets

VARIABLE CLOSE LOOP CONTROLLED APERTURE/SHUTTER SYSTEM

FIELD OF THE INVENTION

The invention relates generally to the field of photographic camera shutters, and particularly to electromagnetic activated camera shutters that control both the aperture size and the exposure time.

BACKGROUND OF THE INVENTION

Shutters that control both the aperture and exposure time have been used to regulate the amount of light that reaches the imaging capture area of a filmstrip contained within a camera or other imaging devices like scanners, printers etc. Open loop systems have been utilized as taught by the prior art to control the operation of the shutter blades. In an open loop control system the input to the shutter is a complex waveform that is tailored to a particular shutter, and no information about the location of the shutter blades is provided to the electronics that controls the shutter. However, the characteristics of a shutter change with time. This is due to changes in friction of the shutter's components which is caused by contamination and wear or temperature changes of the shutter.

A closed loop system is disclosed in Japanese Patent Application No. 61-158586 entitled "Shutter Controller For Camera". This application utilizes a variable size slot 31, that is positioned on a shutter blade actuator ring to attenuate light passage from a LED to a photosensor. The slot, LED and photosensor are aligned in a manner that the slot changes position and size as the actuator ring moves and changes the shutter blades position on the actuator ring.

PROBLEMS TO BE SOLVED BY THE INVENTION

In the foregoing open loop control system the same control signal will not continuously cause the camera shutter blades to form the same aperture size in the same exposure time. Thus, one of the disadvantages of the above open loop control system is that the shutter's electronics did not know the location of the shutter blades to precisely control the size of the aperture opening and exposure time.

Some prior art open loop systems utilized a stepper motor to control the aperture and exposure time of the shutter blades. Thus, one of the disadvantages of the prior art is that the shutter's electronics did not know the location of the shutter blades to precisely control the size of the aperture opening and exposure time.

In the above closed loop system, the attenuation of light that passes through the slot and falls on the photosensor is proportional to the location of the shutter blades on the actuator ring. One of the disadvantage of the above system is that it is difficult to align the LED, slot and photosensor. Any slot-photosensor misalignment will cause an error in determining the position of the shutter blades. Hence, the active area of the photosensor will usually be larger than the slot to enable the slot and photosensor to be accurately positioned for correct operation. In general, the cost of the photosensor is proportional to the area of the photosensor. Thus, if one increased the size of the LED and photosensor to compensate for alignment problems, the cost of the system would increase and take additional space.

SUMMARY OF THE INVENTION

The present invention overcomes the disadvantages of the prior art by providing an electronically actuated shutter in which the location of the shutter blades is known and used to accurately control the aperture size and exposure time. The present invention controls and monitors the movement and position of the shutter blades. This is accomplished by utilizing a gradient neutral density strip, a light source and a light detector. The light from the light source will pass through the gradient neutral density strip and be detected by the light detector in such a manner that the movement of the shutter blades will be proportional to the voltage output of the light detector.

ADVANTAGEOUS EFFECTS OF THE INVENTION

The use of a gradient neutral density strip, a light source and a light detector allows one to accurately control the size of the aperture opening and exposure time of the shutter without accurately aligning the light source, light detector to the gradient neutral density strip. The light detector and light source are common electro-optic devices that may be purchased as a aligned unit from Honeywell, Sony, etc. and the gradient neutral density strip may be easily positioned between the light detector and the light source. Thus, no difficult and time consuming alignment procedure is required, and smaller, cheaper light sources and light detectors may be utilized.

Another advantage of this invention is that the gradient neutral density strip may be easily manufactured to supply the desired light detector and shutter response.

The foregoing is accomplished by providing a electronically actuated shutter device in which the movement and position of one or more shutter blades is monitored to accurately control the aperture size and exposure time of the shutter blades, said device comprising: a light source; a gradient neutral density strip is positioned in a manner that the movement of the shutter blades will cause the strip to move so as to vary the amount of light transmitted through the strip by the source; a detector which monitors the amount of light transmitted through the strip by the source to produce a signal that represents aperture size of the shutter blades; and means coupled to the electronically actuated shutter device for controlling position of the shutter blades so that the changes in position of the strip will be proportional to aperture size of the shutter blades, whereby, the shutter blades may form a plurality of aperture sizes with a plurality of exposure times.

DESCRIPTION OF THE PREFERRED EMBODIMENTS

Figure 1:
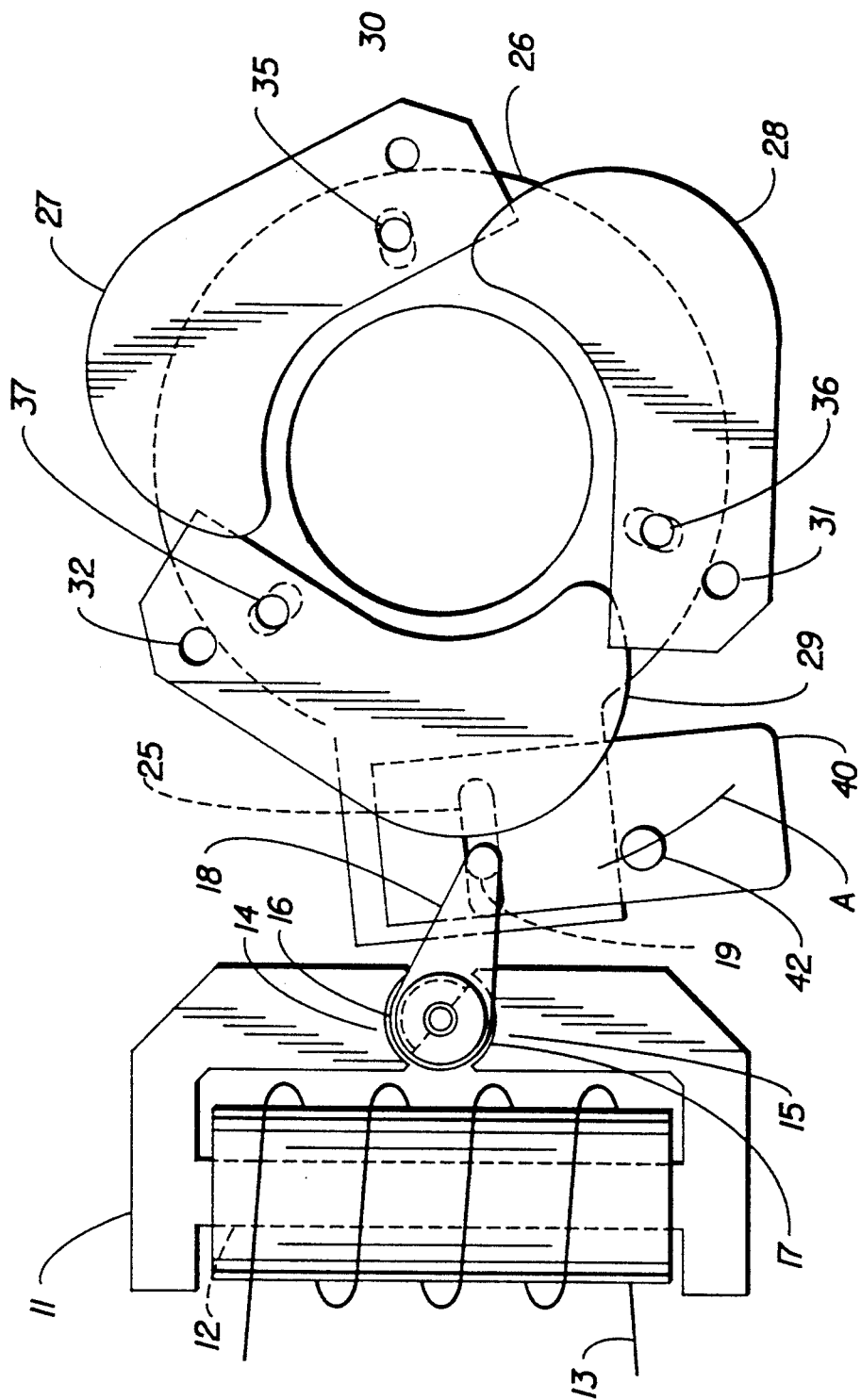
FIG. 1 is a top view of the electromagnetic shutter.

Referring now to the drawings in detail, and more particularly to FIG. 1, the reference character 11 represents a yoke that includes a core 12, a coil 13 and pole tips 14 and 15. Cylindrically shaped permanent magnet 16 is positioned in yoke 11 and between pole tips 14 and 15 in a manner that a gap 17 will be formed. Arm 18 is connected to magnet 16 and pin 19 of arm 18 engages gradient neutral density strip 40 and slot 25 of ring 26. Ring 26 is connected to shutter blades 27, 28 and 29. Ring 26 turns on bearings (not shown). Pin 30 connects shutter blade 27 to ring 26 and pin 31 connects shutter blade 28 to ring 26. Shutter blade 29 is connected to ring 26 by pin 32. Shutter blade 27 pivots about pin 35 and shutter blade 28 pivots about pin 36. Shutter blade 29 pivots about pin 37. It is realized that additional pins may be used to connect additional shutter blades to ring 26 to increase the control of the formation of aperture openings.

The high permeability iron that is used to form pole tips 14 and 15 is shaped around magnet 16 to form gap 17 in order to provide a small amount of lock-in torque when shutter blades 27, 28 and 29 are closed. This insures the closure of blades 27, 28 and 29 when no current travels through coil 13.

The amount and direction of current input to coil 13 determines the magnetic flux between pole tips 14 and 15 and hence, the position of magnet 16, arm 18 and ring 26. When no current is applied to coil 13, magnet 16 will tend to rotate counterclockwise. This is due to the magnetic attraction (lock-in torque) that magnet 16 has with pole tips 14 and 15. This also represents the position of magnet 16, arm 18, ring 26, shutter blades 27, 28 and 29 when blades 27, 28 and 29 are closed. Therefore a power off condition represents a closed shutter. When current is applied to coil 13 in the proper direction a magnetic flux from core 12 will produces a torque on magnet 16 and consequently causes arm 18 to rotate ring 26 in a clockwise direction. The clockwise rotation of ring 26 will cause shutter blades 27, 28 and 29 to open.

The varying of the amount of current travelling in coil 13 will vary the position of magnet 16, arm 18, ring 26 and blades 27, 28 and 29. Gradient strip 40 is connected to ring 26 by any known means ie. glueing etc. Ring 26 may also be fabricated to include gradient strip 40 as a portion of ring 26. Thus, the rotation of ring 26 will also cause strip 40 to move along path A between light source 41 and light detector 42. Hence, one is able to monitor the position of magnet 16 so that shutter blades 27, 28 and 29 may form many different aperture openings.

Figure 2:
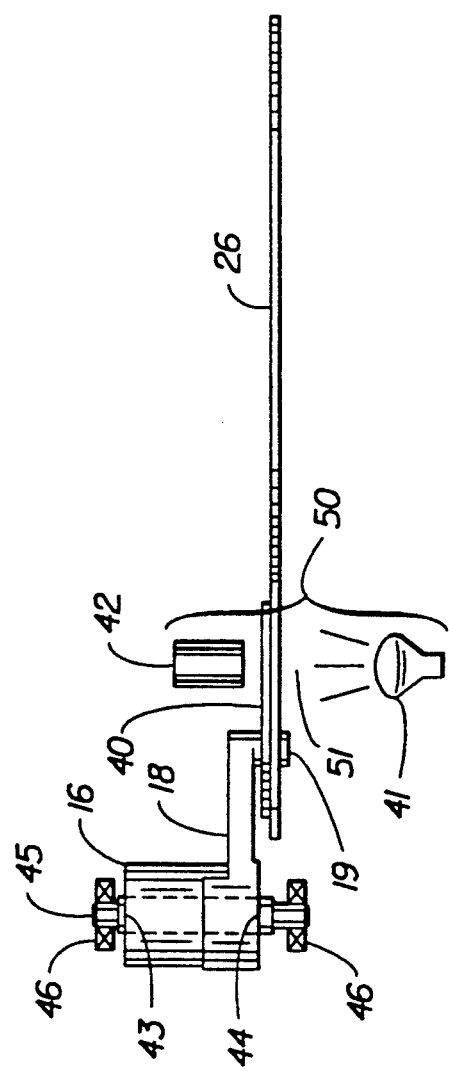
FIG. 2 is a side view of the electromagnetic shutter.

FIG. 2 is a side view of the components that may be used to connect magnet 16 to arm 18 and the orientation of neutral density gradient strip 40, light 41 and light detector 42. Magnet 16 has a hole 43 running from its top surface to its bottom surface. Arm 18 has a hole 44 running from its top surface to its bottom surface. Shaft 45 is inserted into holes 43 and 44. Bearings 46 are connected to shaft 45 to insure that magnet 16 and arm 18 with pin 19 attached thereto may rotate about shaft 44.

Neutral gradient density strip 40 is manufactured by Rochester Monotype of 360 North Street, Rochester, N.Y. 14605.

Electro-optic device 50 includes: a light source 41, and a light detector 42 that is in alignment with source 41. Neutral gradient density strip 40 is inserted in gap 51 of device 50 in a manner that strip 40 will be attached to ring 26 so that strip 40 will move with ring 26.

Strip 40 is constructed of a material in which the opacity or the degree in which the material obstructs the transmission of light varies in a known manner across its length. Thus, when a light beam from light source 41 is transmitted through material 40 and detected by light detector 42, the voltage outputted by detector 42 will be a function of the position of material 40. Thus, the position of shutter blades 27, 28 and 29 are monitored. Light detector 42 will have an analog voltage output that is representative of the aperture size formed by shutter blades 27, 28 and 29. The control electronics described in FIG. 3 will monitor the output voltage of detector 42 and control the current being transmitted through coil 13 to achieve the desired aperture opening.

Figure 3:
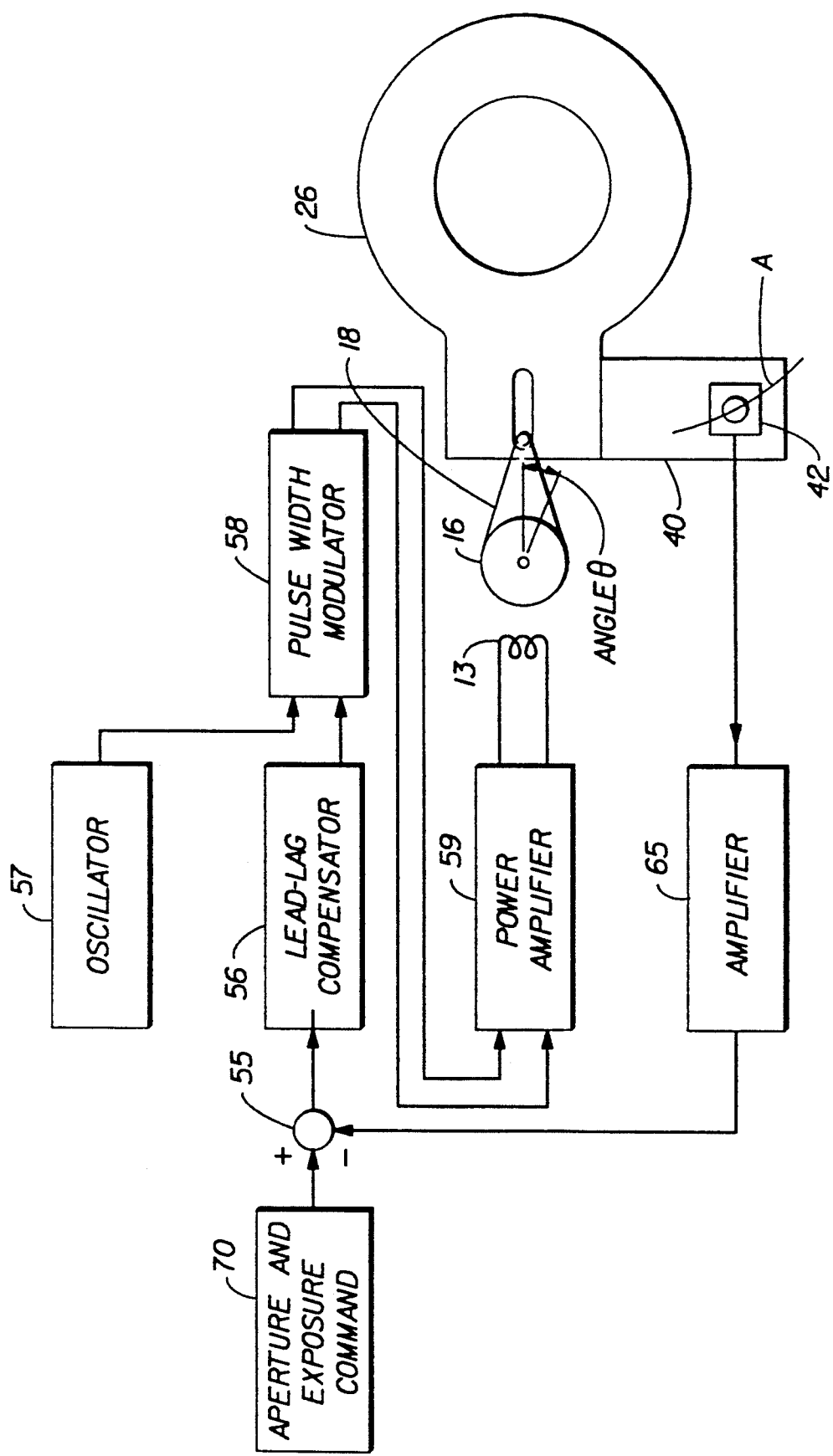
FIG. 3 is a schematic block diagram of the drive and control circuitry of the electromagnetic shutter.

FIG. 3 is a schematic block diagram of the drive and control circuit of the apparatus of the invention. The output of aperture and exposure command 70 is a signal that represents the desired aperture opening and shutter exposure for the scene that is being observed.

The output of command 70 is connected to one of the two inputs of summation amplifier 55. The second input to amplifier 55 is the output of amplifier 65. The output of amplifier 55 is connected to the input of Lead-Lag Compensator 56. The output of compensator 56 is coupled to one of the two inputs of pulse width modulator 58. The second input to modulator 58 is the output of 25 KHz oscillator 57. The two outputs of modulator 58 are connected to the inputs of power amplifier 59. One of the outputs of amplifier 59 is coupled to one end of coil 13 and the other output of amplifier 59 is coupled to the other end of coil 13. Gradient strip 40 is connected to ring 26 in a manner that the movement of blades 27, 28 and 29 will cause, strip 40 to move in a manner that the light emitted by source 41 will be transmitted through strip 40. Detector 42 is positioned in a manner to detect the amount of light that source 41 transmits through strip 40. The amount of light detected by detector 42 will vary by the location of strip 40 as it travels along path A. The output of detector 42 is coupled to the input of amplifier 65.

Command 70 represents the light level of a scene that is going to be photographed and produces a voltage output that is proportional to the measured light level. Command 70 uses the light level measured to also determine the various combinations of shutter speeds and aperture openings that will supply a correct exposure to the film (not shown). The operation of command 70 will be more fully set forth in the description of FIG. 4.

Associated with each output of command 70 is a specific shutter exposure time and a specific aperture opening. The output of command 70 is fed to the positive input of summation amplifier 55. The negative input to summation amplifier 55 will be a signal that represents the actual position of shutter blades 27, 28 and 29 (shown in FIG. 1). Detector 42 is a linear device that measures the amount of light that passes through strip 40 from light source 41. The amplitude of the output of detector 42 is directly related to the angular orientation of magnet 16 i.e. angle $\theta$ which is related to the position of strip 40. The output of detector 42 is a feedback signal that is amplified by amplifier 65 and transmitted to the negative input of summation amplifier 55. Amplifier 55 will measure the difference between its positive and negative inputs. When the difference between the positive and negative inputs to amplifier 55 reach a desired state, amplifier 55 will output a signal that will cause magnet 16 to move to a specific orientation. This will cause shutter blades 27, 28 and 29 to form a desired aperture opening. The duration of time that amplifier 55 outputs a pulse will determine the exposure time.

Lead-Lag Compensator 56 supplies a compensation factor to the output of amplifier 55 to prevent shutter blades 27, 28 and 29 from overshooting the aperture opening (not shown) or having a sluggish response. Lead-Lag Compensator 56 is disclosed on page 779 of Microelectronic Circuits by Adel S. Sedra and Kenneth C. Smith (published 1991 by Sanders College Publishing), which is incorporated herein by reference.

Oscillator 57 outputs a free running 25 KHz triangular wave form that is symmetric about a stable dc voltage. Pulse width modulator 58 adds the above triangular waveform to the compensation signal outputted by compensator 56 to determine the duty cycle of the signal that will cause the movement of magnet 16 and the direction magnet 16 will travel, i.e. clockwise or counter-clockwise. The operation and description of modulator 58 will be more fully set forth in the description of FIG. 5.

The output of modulator 58 is amplified by amplifier 59 and transmitted to coil 13.

Figure 4:
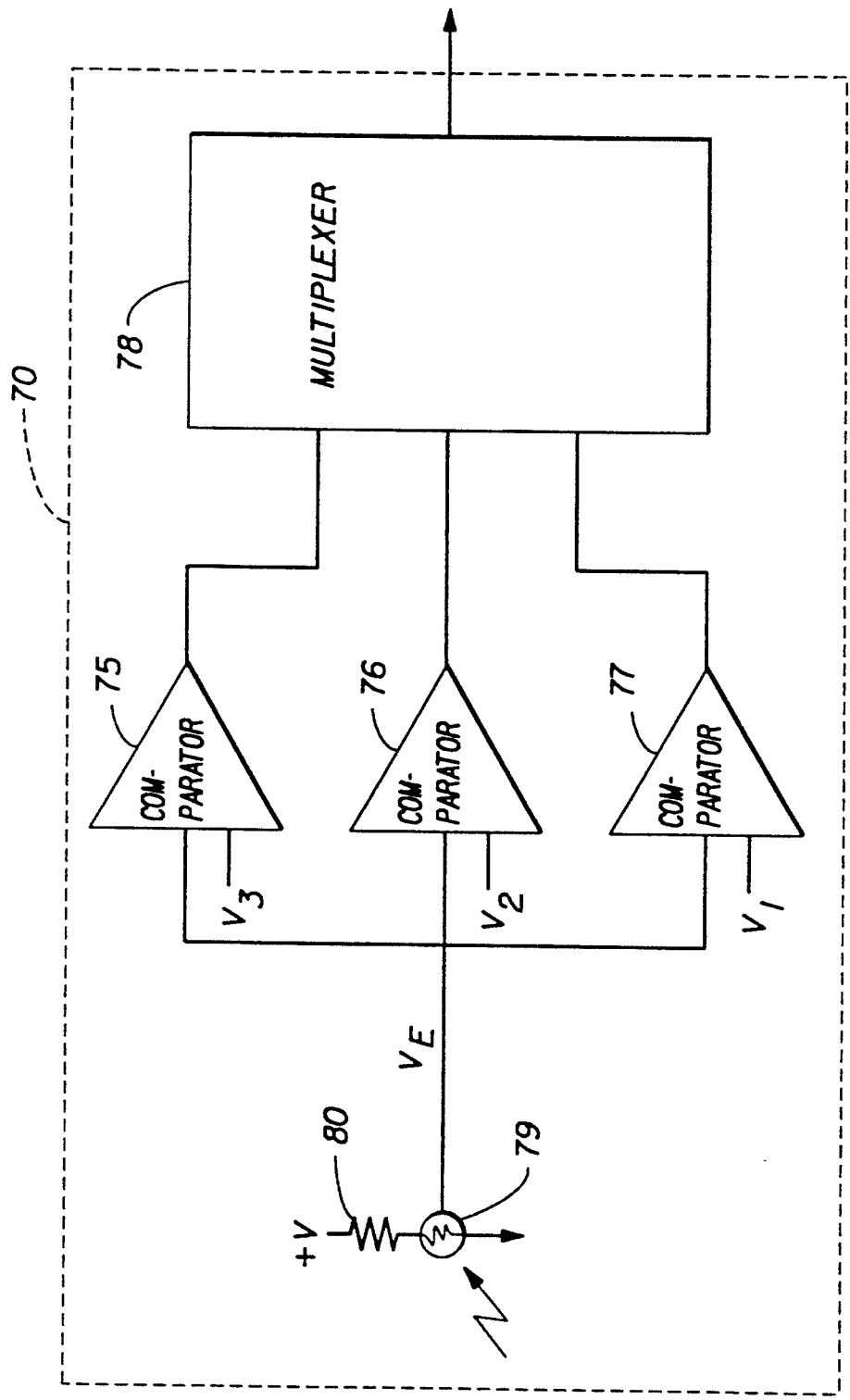
FIG. 4 is a schematic block diagram of aperture and exposure command 70.

FIG. 4 is a block diagram that shows command 70 of FIG. 3 in greater detail. Command 70 is able to select one of three different aperture openings. Command 70 includes comparators 75, 76 and 77, multiplexer 78 and photocell 79.

Photocell 79 measures the light level of a scene that is going to be photographed and photocell 79 produces a voltage output $V_E$ that is proportional to the measured light level. The above light level $V_E$ is inputted to one of the two inputs of comparators 75, 76 and 77. The other inputs to comparators 75, 76 and 77 respectively are $V_1$, $V_2$ and $V_3$. $V_1$ is the lowest exposure reference voltage and $V_2$ is the middle exposure reference voltage. $V_3$ is the highest reference voltage. Reference voltages $V_1$, $V_2$ and $V_3$ are connected by a resistance ladder to the power supply of a camera (not shown). Comparator 77 will compare $V_E$ with $V_1$. If $V_1$ is equal to $V_E$ comparator 77 will have an output signal Comparator 76 compares $V_E$ with $V_2$ If $V_2$ is equal to $V_E$ comparator 76 will have an output signal. Comparator 75 will compare $V_3$ to $V_E$. If $V_3$ is equal to $V_E$ comparator 65 will have an output signal. The width of the output pulse of comparator 75, 76 and 77 will determine the exposure time.

The output of comparator 75 is connected to one of the inputs of multiplexer 78 and the output of comparator 66 is connected to one of the inputs of multiplexer 78. The output of comparator 77 is connected to one of the inputs of multiplexer 78. Multiplexer 78 will select the comparator that has an output to determine the aperture opening and exposure time. The output of multiplexer 78 is coupled to the positive input of summation amplifier 55 of FIG. 3. It is realized that additional comparators may be connected to a resistance ladder and multiplexer 78 to form different aperture openings and exposure times.

Figure 5:
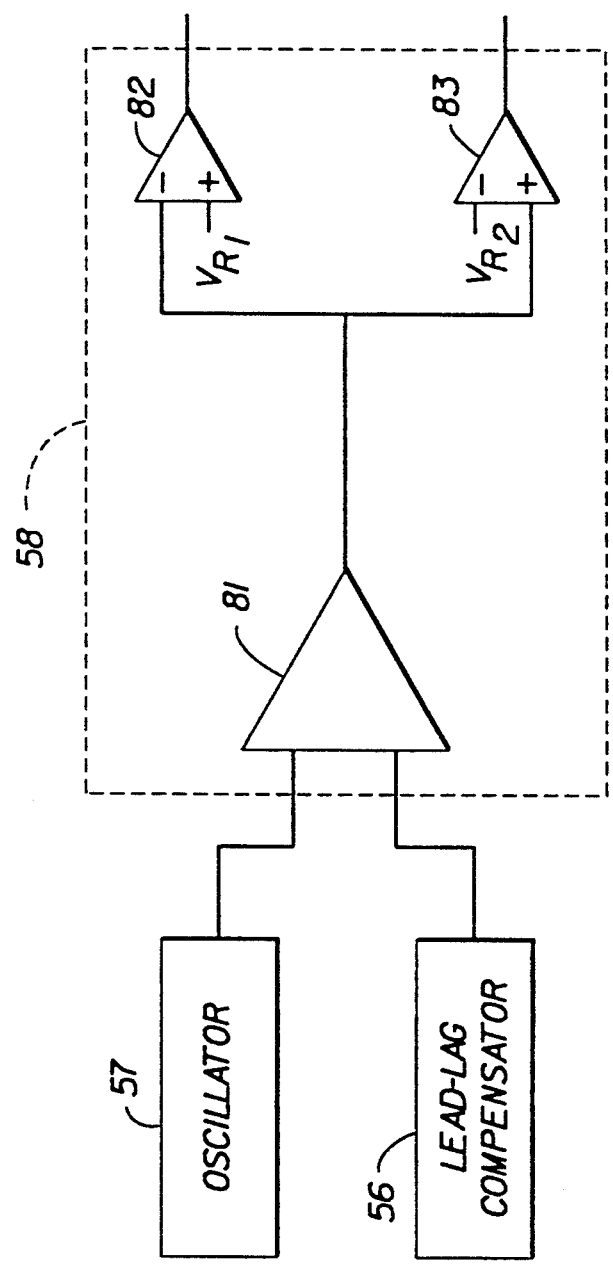
FIG. 5 is a block diagram that shows pulse width modulator 58 of FIG. 3 in greater detail.

FIG. 5 is a block diagram that shows pulse width modulator 58 of FIG. 3 in greater detail. Modulator 58 includes summation amplifier 81 and comparators 82 and 83.

One of the two inputs of amplifier 81 is connected to the free running 25 KHz triangular wave output of oscillator 57 that is stable about adc voltage. The second input to amplifier 81 is the compensation signal outputted by compensator 56. The output of amplifier 81 is connected to the negative input of comparator 82 and the positive input of comparator 82. The positive input of comparator 82 is connected to reference voltage $V_{R1}$ which is set to 1 volt. The negative input of comparator 83 is connected to reference voltage $V_{R2}$, which is set to 2 volts. The output of comparator 71 is connected to one end of coil 13 via amplifier 59 and the output of comparator 83 is connected to the other end of coil 13 via amplifier 59.

Amplifier 81 adds the 25 KHz triangular wave output of oscillator 57 to the output of Lead-Lag Compensator 56. When the signal from compensator 56 changes and thereby requesting a positive drive current the stable dc level increases and the tips of the triangle of the triangular wave shift through a set threshold which produces positive output pulses. Comparator 82 will compare the above output pulses with $V_{R1}$, and when the two signals are equal comparator 82 will transmit a signal to one of the ends of coil 13 via amplifier 59. The aforementioned signal will cause magnet 16, arm 18, blades 27, 28 and 29 to rotate in a clockwise direction.

When the signal from compensator 56 changes and thereby requesting a negative drive current the stable dc level decreases and the tips of the triangle of the triangular wave shift through a set lower threshold which produces negative output pulses. Comparator 83 will compare the above output pulses with $V_{R2}$ and when the two signals are equal comparator 83 will transmit a signal to one of the ends of coil 13 via amplifier 59. The aforementioned signal will cause magnet 16, arm 18 and blades 27, 28 and 29 to rotate in a counter-clockwise direction.

Thus, when a picture is taken amplifier 81 produces a signal which shifts the triangular waveform through the upper and lower trip points of comparators 82 and 83 producing a pulse width modulated output from comparator 82 and 83. Comparator 82 produces positive current flow and comparator 83 produces negative or reverse current flow. This effectively causes magnet 16 and arm 18 to accelerate shutter blades 27, 28 and 29 to the requested aperture opening. After the exposure time magnet 16, arm 18 and blades 27, 28 and 29 are returned to their closed positions.

Figure 6:
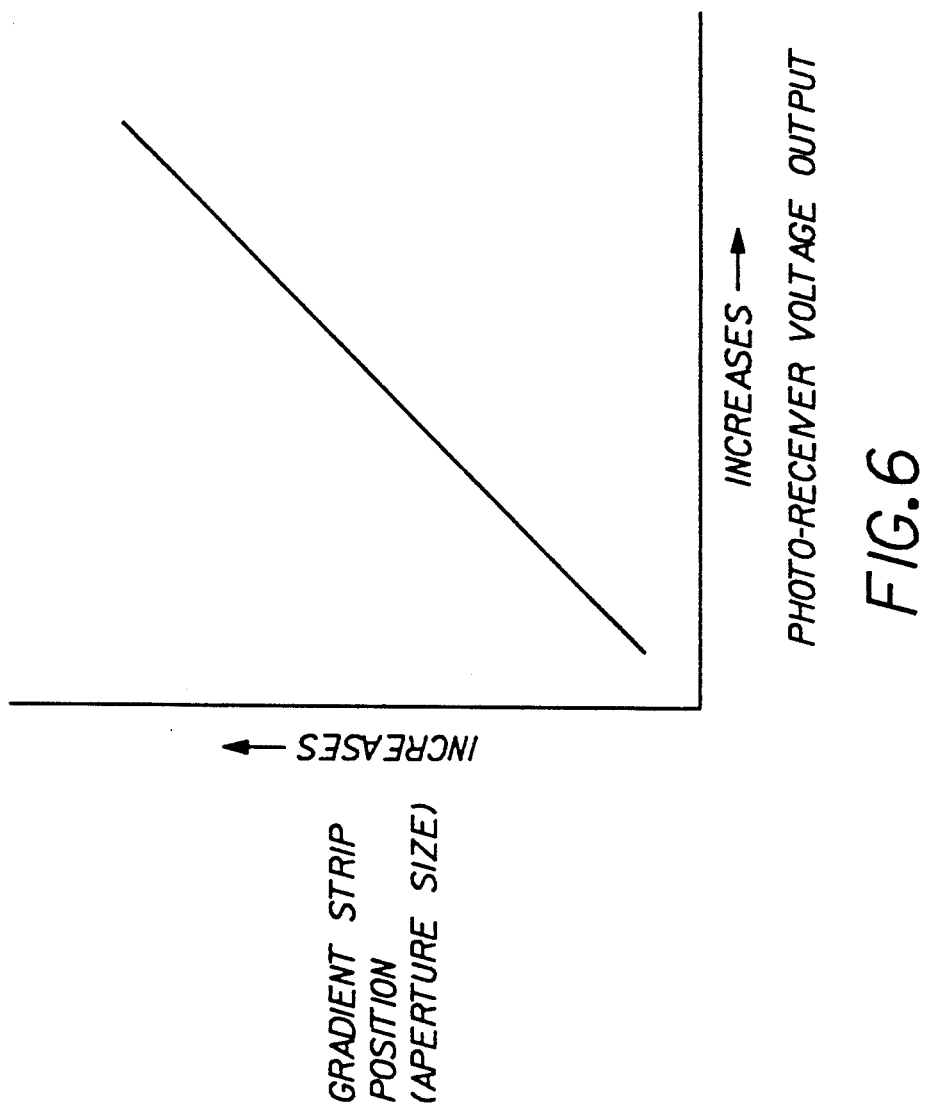
FIG. 6 is a graph of the position of gradient strip 40 vs. the voltage outputted by detector 42.

FIG. 6 is a graph of the position of gradient strip 40 vs. the voltage outputted by detector 42. The position of gradient strip 40 in relation to detector 42 represents the aperture size of shutter blades 27, 28 and 29. Thus, the aperture size of blades 27, 28 and 29 is proportional to the voltage output of detector 42.

The above specification describes a new and improved variable close loop controlled aperture/shutter system. It is realized that the above description may indicate to those skilled in the art additional ways in which the principles of this invention may be used without departing from the spirit. It is, therefore, intended that this invention be limited only by the scope of the appended claims.

What is claimed is:

1. An electronically actuated shutter device in which the movement and position of one or more shutter blades is monitored to accurately control aperture size and exposure time of the shutter blades, said device characterized by:

a light source;

a gradient neutral density strip positioned in a manner that the movement of the shutter blades will cause said strip to move so as to vary the amount of light transmitted through said strip by said source;

a detector which monitors the amount of light transmitted through said strip by said source to produce a signal that represents aperture size of the shutter blades; and means coupled to the electronically actuated shutter device for controlling position of the shutter blades so that the changes in position of said strip will be proportional to aperture size of the shutter blades, whereby, the shutter blades may form a plurality of aperture sizes with a plurality of exposure times.

2. The device claimed in claim 1, wherein said controlling-means comprises:

a yoke comprising a core and a coil, said coil being capable of receiving current to produce a first magnetic field within a space bounded by said core;

a movable magnet that is coupled to the shutter blades, said magnet having a second magnetic field and being positioned within said space in a manner that a gap will contiguously surround said magnet and be present between said core and said magnet so that said second magnetic field interacts with said first magnetic field; and means coupled to said coil and responsive to said signal for regulating the first magnetic field and the position of said magnet and one or more shutter blades so that the change in position of said magnet and the shutter blades form an aperture size which will be proportional to the change in position of said strip.

3. The device claimed in claim 2, further including:

a first member coupled to said movable magnet; and a second member coupled to said first member and the shutter blades to facilitate movement of the shutter blades.

4. The device claimed in claim 2, wherein said regulating means comprises:

means for determining an aperture size and exposure to take a picture;

means coupled to said determining means and said detector for measuring the difference between the desired aperture size and the present position of the shutter blades;

a clock oscillator that has an output that is symmetric about a stable voltage; and means responsive to said oscillator and said difference, measure means and coupled to both ends of said coil for modulating a clock pulse and said determining means measured signal to determine the direction of travel and magnitude of the coil current travelling through said coil.

5. The device claimed in claim 4, further including an amplifier coupled to said modulating means and both ends of said coil to increase the magnitude of the coil current.

6. The device claimed in claim 4, wherein said determining means comprises:

means for deciding the amount of light that is available to take a picture;

means coupled to the output of said deciding means for comparing the output of said deciding means with a plurality of individual aperture sizes and exposures and selecting which aperture size and exposure equals the opening selected by said deciding means; and a multiplexer whose input is coupled to said comparing means and whose output is coupled to said difference measuring means to determine the correct aperture size and exposure.

7. The device claimed in claim 6, wherein said deciding means is a photocell that outputs voltages that are proportional to the amount of light said photocell senses.

8. The device claimed in claim 6, wherein said comparing means comprises: a plurality of comparators.

9. The device claimed in claim 7, wherein said difference measuring means comprises: a summation amplifier.

10. The device claimed in claim 4, wherein said modulating means comprises: a pulse width modulator.

11. The device claimed in claim 4, further including a Lead-Lag Compensator that is coupled to the output of said difference measuring means and the input of said modulating means to prevent the shutter blades from overshooting the aperture opening or having a sluggish response.

* * * * *

UNITED STATES PATENT AND TRADEMARK OFFICE
CERTIFICATE OF CORRECTION

PATENT NO. : 5,325,142
DATED : June 28, 1994
INVENTOR(S) : Jean F. Depatie, William D. VanArsdale, William M. Leonard It is certified that error appears in the above-indentified patent and that said Letters Patent is hereby corrected as shown below:

Column 8, line 6, "difference, measure" should read -- difference measuring --.

Signed and Sealed this

Sixth Day of September, 1994

Attest:

BRUCE LEHMAN

Attesting Officer  Commissioner of Patents and Trademarks